United States Patent [19]

Takarada et al.

[11] Patent Number: 5,248,750

[45] Date of Patent: Sep. 28, 1993

[54] ORGANOPOLYSILOXANES AND METHODS OF MAKING

[75] Inventors: Mitsuhiro Takarada; Yuji Yoshikawa; Kenichi Isobe, all of Annaka, Japan

[73] Assignee: Shin-Etsu Chemical Co., Ltd., Tokyo, Japan

[21] Appl. No.: 783,973

[22] Filed: Oct. 29, 1991

[30] Foreign Application Priority Data

Oct. 31, 1990 [JP] Japan .................................. 2-294962

[51] Int. Cl.$^5$ .............................................. C08G 77/06
[52] U.S. Cl. .......................................... 528/15; 528/26; 528/27; 528/29; 528/43; 556/462; 556/450; 556/479
[58] Field of Search ...................... 528/15, 26, 27, 29, 528/43; 556/462, 450, 479

[56] References Cited

U.S. PATENT DOCUMENTS 4,294,974 10/1981 LeBoeuf ............................. 556/440
4,940,766 7/1990 Gay et al. .......................... 528/18

FOREIGN PATENT DOCUMENTS 0281718 9/1988 European Pat. Off. .
2150941 7/1985 United Kingdom .

Primary Examiner—Melvyn I. Marquis
Attorney, Agent, or Firm—Birch, Stewart, Kolasch & Birch

[57] ABSTRACT

Organopolysiloxanes having two different functional groups selected from the group consisting of 3-glycidoxy-propyl, 2-(3',4'-epoxycyclohexyl)ethyl, 3-hydroxypropyl, 3-(2'-hydroxyethoxy)propyl, 3-acryloxypropyl, and 3-methacryloxypropyl groups are more compatible with organic resins and more effective for tailoring the organic resins. They are produced by hydrosilylation of organohydrogenpolysiloxanes with functional group-containing alkenes.

16 Claims, 4 Drawing Sheets

ORGANOPOLYSILOXANES AND METHODS OF MAKING

This invention relates to organopolysiloxanes and methods for preparing the same. More particularly, it relates to novel organopolysiloxanes having organic functional groups suitable for use as modifiers of organic resins in paint, molding material, medical material, and coating material applications.

BACKGROUND OF THE INVENTION

From the past, organopolysiloxanes having an organic functional group were widely used as resin modifiers in the fields of paint, molding materials, medical materials, and coating materials for the purpose of imparting useful properties such as heat resistance, weather resistance, mold release, formability and thermal impact to organic resins.

There were known various organopolysiloxanes having an organic functional group, for example, dimethylpolysiloxane having an alcoholic hydroxyl group at either end (see Japanese Patent Publication No. 8718/1979), dimethylpolysiloxane having a functional group at either end (see Japanese Patent Application Kokai Nos. 217515/1983 and 123502/1984), methylpolysiloxane having a functional group on a side chain (see Japanese Patent Publication Nos. 18968/1986 and 28880/1986), and methylphenylpolysiloxane having an alcoholic hydroxyl group at either end and on a side chain. All these organopolysiloxanes have the same functional groups in their molecule and no polysiloxanes having different functional groups in a molecule have been proposed. The organopolysiloxanes having the same functional groups in their molecule possess properties corresponding to the respective functional groups.

There is a need for an organopolysiloxane which is more compatible with organic resins and more effective as a resin modifier than the conventional organopolysiloxanes.

SUMMARY OF THE INVENTION

The inventors have discovered that by sequentially effecting consecutive addition reaction of two unsaturated compounds selected from the group consisting of allyl glycidyl ether, 1-vinyl-3,4-epoxycyclohexane, allyl alcohol, allyl glycol, allyl acrylate, and allyl methacrylate to SiH of an organohydrogenpolysiloxane of the following average composition formula (3):

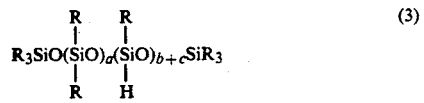

wherein R is an alkyl group having 1 to 6 carbon atoms or phenyl group, and letters a, b and c are positive numbers within the range: $1 \leq a \leq 20$, $1 \leq b \leq 10$, and $1 \leq c \leq 10$, more particularly, by adding b mol of a first unsaturated compound to SiH of an organohydrogenpolysiloxane of formula (3) and adding c mol of a second unsaturated compound to c mol of unreacted SiH of the organohydrogenpolysiloxane of formula (3), there is obtained an organopolysiloxane of the following average composition formula (1):

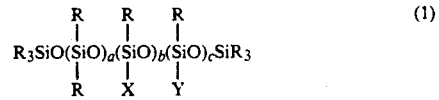

wherein X and Y are different organic groups selected from the group consisting of 3-glycidoxypropyl, 2-(3',4'-epoxycyclohexyl)ethyl, 3-hydroxypropyl, 3-(2'-hydroxyethoxy)propyl, 3-acryloxypropyl, and 3-methacryloxypropyl groups, and R, a, b and c are as defined above.

The inventors have also discovered that by adding an unsaturated compound selected from the group consisting of allyl glycidyl ether, 1-vinyl-3,4-epoxycyclohexane, allyl alcohol, allyl glycol, allyl acrylate, and allyl methacrylate to SiH of an organohydrogenpolysiloxane of the following average composition formula (4):

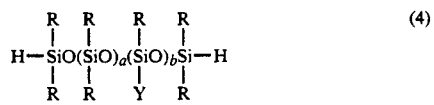

wherein Y, R, a, and b are as defined above, the unsaturated compound forming a functional group different from Y of the organohydrogenpolysiloxane of formula (4), there is obtained an organopolysiloxane of the following average composition formula (2):

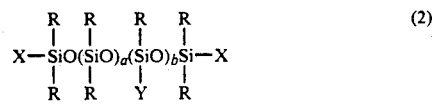

wherein X, Y, R, a, and b are as defined above.

The organopolysiloxanes of formulae (1) and (2) each having two different functional groups within a molecule are highly compatible with organic resins such as epoxy resins and acrylic resins and capable of imparting desired properties such as heat resistance, weather resistance, formability, water repellency and adhesion to the resins depending on particular types of functional groups they possess. For example, polysiloxanes having both epoxy and alcoholic hydroxyl groups or both (meth)acryloxy and alcoholic hydroxyl groups are effective for modifying various organic resins through grafting, thereby improving interfacial adhesion and increasing strength by utilizing a multiplicity of available crosslinking points. In particular, since the present organopolysiloxanes each having two different functional groups which are different in reactivity can be used in such a manner that two different modes of crosslinking occur or polymerization and crosslinking occur separately, they are advantageous resin modifiers. The organopolysiloxanes of formula (2) wherein Y is 3-acryloxypropyl or 3-methacryloxypropyl group are particularly useful in that when they are subject to radical polymerization at their acryl or methacryl group or radical copolymerization at their acryl or methacryl group with other polymerizable monomers, there are obtained functional group-containing siloxane grafted acrylic polymers which were difficult to synthesize in the prior art. Moreover, the present organopolysiloxanes, when having diphenylsiloxane or methylphenylsiloxane units incorporated therein, become more compatible with organic resins.

Therefore, the present invention provides organopolysiloxanes of formulae (1) and (2) as defined above. Methods for producing them are by consecutive hydrosilylation of a compound of formula (3) with two different unsaturated compounds and by hydrosilylation of a compound of formula (4) with an unsaturated compound.

DETAILED DESCRIPTION OF THE INVENTION

Figure 1:
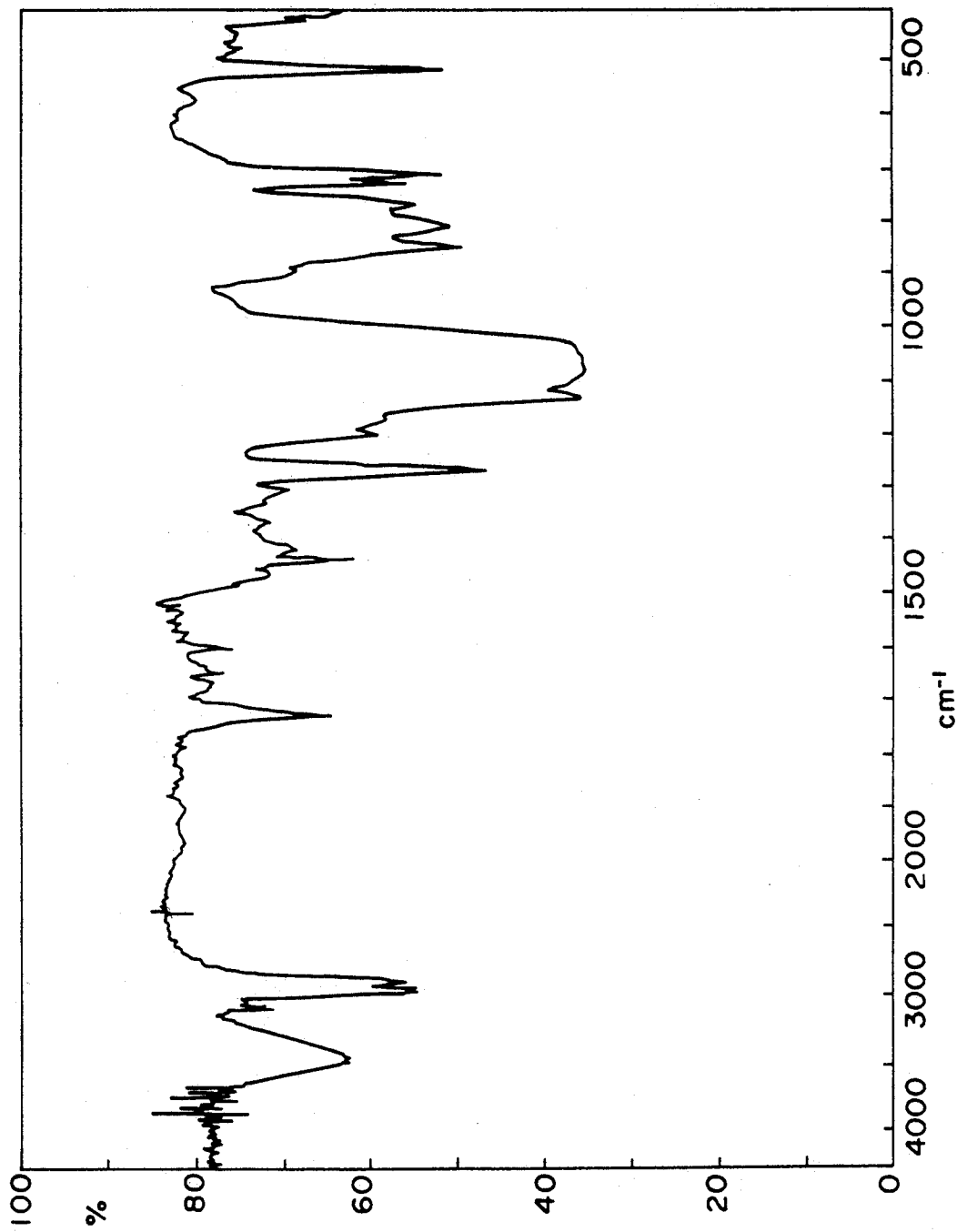
FIGS. 1 to 4 are IR absorption spectra of organopolysiloxanes of the present invention.

The present invention provides organopolysiloxanes of the following average composition formulae (1) and (2).

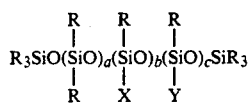  (1)

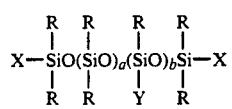  (2)

In formulae (1) and (2), X and Y are different organic groups selected from the group consisting of 3-glycidoxypropyl, 2-(3′,4′-epoxycyclohexyl)ethyl, 3-hydroxypropyl, 3-(2′-hydroxyethoxy)propyl, 3-acryloxypropyl, and 3-methacryloxypropyl groups, R is an alkyl group having 1 to 6 carbon atoms or phenyl group, and letters a, b and c are positive numbers within the range: $1 \leq a \leq 20$, $1 \leq b \leq 10$ and $1 \leq c \leq 10$.

More particularly, R is an alkyl group having 1 to 6 carbon atoms such as methyl, ethyl and propyl groups or a phenyl group, with the methyl and phenyl groups being preferred for commercial purposes. Preferably, both methyl and phenyl groups are used together. For example, by incorporating a diphenylsiloxane or methylphenylsiloxane unit into a siloxane having a dimethylsiloxane unit in the backbone, there can be obtained an organopolysiloxane which is further improved in reactivity and compatibility with organic resins. Letters a, b, and c are within the above-defined range. As the siloxane chain becomes longer (a, b, and c in excess of their upper limit), the siloxane becomes higher in viscosity, more difficult to handle, and less compatible with organic resins.

The compounds of formula (1) can be readily synthesized in high yields by incorporating different organic groups X and Y through partial hydrosilylation reaction in accordance with the following method. In the following formulae, X, Y, R, a, b, and c are as defined above.

First, b mol of an unsaturated compound selected from the group consisting of allyl glycidyl ether, 1-vinyl-3,4-epoxycyclohexane, allyl alcohol, allyl glycol, allyl acrylate, and allyl methacrylate is added to SiH of an organohydrogenpolysiloxane of the following average composition formula (3).

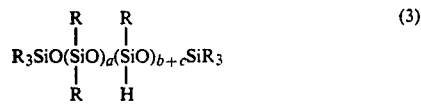  (3)

There is obtained an addition reaction product of the following average composition formula (3′).

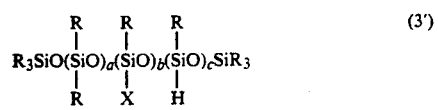  (3′)

Alternatively, the compound of formula (3′) can be separately prepared by hydrolysis or equilibration reaction.

Next, c mol of another unsaturated compound selected from the same group as above is added to the compound of formula (3′) having residual SiH groups. There is obtained an organopolysiloxane of formula (1).

The organohydrogenpolysiloxane of formula (3) can be readily prepared by effecting equilibration reaction among tetramethylcyclotetrasiloxane, a cyclic polysiloxane, and a disiloxane as a terminal group in the presence of sulfuric acid or a sulfonic acid. Several, non-limiting examples of the organohydrogenpolysiloxane of formula (3) are given below. In the following description, Me is methyl and Ph is phenyl.

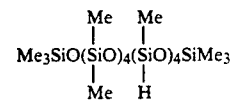

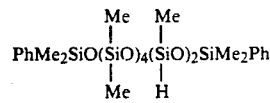

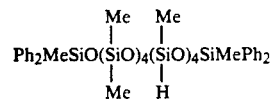

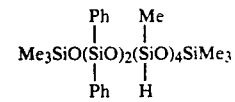

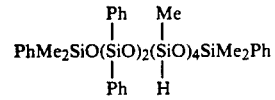

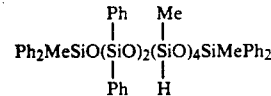

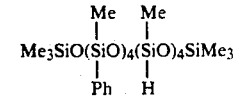

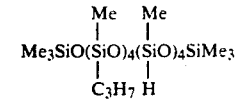

Preferably, the above-mentioned consecutive hydrosilylation reactions are carried out in the presence of a platinum catalyst. That is, an organohydrogenpolysiloxane of formula (3) is partially hydrosilylated with a functional group-containing alkene or unsaturated compound in the presence of a platinum catalyst. After the consumption of the functional group-containing alkene is complete, hydrosilylation with another functional group-containing alkene is started.

Any desired one of well-known platinum catalysts for hydrosilylation may be used. For commercial purposes, chloroplatinic acid is preferred in that addition reaction can be complete by heating at a temperature of about 60° C. to 120° C. for about 2 to 8 hours. The platinum catalyst is used in a catalytic amount, often about 2 to 400 ppm based on the weight of the organohydrogenpolysiloxane.

Reaction may be carried out in suitable solvents, for example, aromatic hydrocarbon solvents such as benzene, toluene and xylene and aliphatic hydrocarbon solvents such as hexane, heptane, and octane for controlling the reaction system viscosity and reaction temperature. When it is desired to add alcoholic hydroxyl group-containing alkenes, alcoholic solvents such as ethanol, isopropyl alcohol, butanol, and isobutanol may be used to which system potassium acetate is added in an amount of about 0.001 to 0.5% by weight based on the organohydrogenpolysiloxane to complete the addition reaction quickly.

In the alternative method, an organopolysiloxane of formula (1) is produced by separately preparing an organohydrogenpolysiloxane of formula (3') through acid equilibration reaction or decomposition reaction and effecting similar addition reaction. In this embodiment, X in formula (3') is preferably 3-acryloxypropyl or 3-methacryloxypropyl group.

In another form of the invention, an organopolysiloxane of formula (2) having a terminal functional group different from a side functional group can be readily synthesized in high yields by effecting hydrosilylation reaction between a double hydrogen-terminated organopolysiloxane of average composition formula (4) and a functional group-containing alkene. In the following formulae, X, Y, R, a, b, and c are as defined above.

To SiH of an organohydrogenpolysiloxane of average composition formula (4):

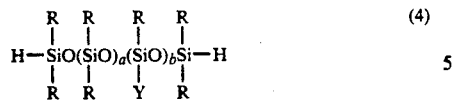

is added an unsaturated compound selected from the group consisting of allyl glycidyl ether, 1-vinyl-3,4-epoxycyclohexane, allyl alcohol, allyl glycol, allyl acrylate, and allyl methacrylate which provides a functional group different from Y of the organohydrogenpolysiloxane of formula (4). There is obtained an organopolysiloxane of formula (2).

The functional group Y of the organohydrogenpolysiloxane of formula (4) should preferably be an organic group less reactive to sulfuric acid and sulfonic acids, typically acryloxypropyl and methacryloxypropyl groups.

The organohydrogenpolysiloxane of formula (4) can be readily prepared by effecting equilibration reaction among a tetraalkyldisiloxane, a hydrolysate of a dialkoxysilane containing a functional group Y, and a cyclic polysiloxane in the presence of sulfuric acid or a sulfonic acid. Several, non-limiting examples of the organohydrogenpolysiloxane of formula (4) are given below. In the following formulae, Y' is a 3-acryloxypropyl or 3-methacryloxypropyl group.

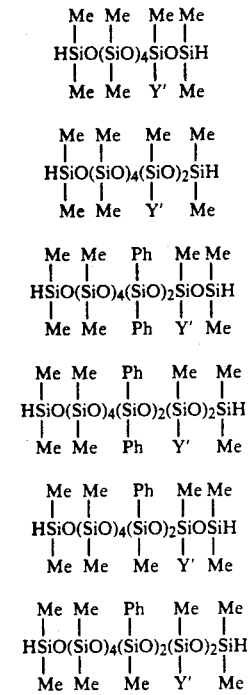

The hydrosilylation reaction between an organohydrogenpolysiloxane of formula (4) and a functional group-containing alkene may be carried out as in the above-mentioned hydrosilylation reaction to produce an organopolysiloxane of formula (1).

There have been described organopolysiloxanes having different functional groups in a molecule which are highly compatible with organic resins and, when added to organic resins as a silicone resin modifier, can impart to the resins heat resistance, weather resistance, formability, water repellency, adhesion or any other desired properties attributable to the functional groups. The manufacturing methods of the present invention permit for easy synthesis of such organopolysiloxanes having different functional groups in high yields.

EXAMPLE

Examples of the present invention are given below by way of illustration and not by way of limitation.

EXAMPLE 1

A flask was charged with 40 grams of toluene, 9.6 grams of allyl methacrylate, and 0.1 gram of 2% ethanol solution of chloroplatinic acid. To the flask at 80° C., 100 grams of hydrogenpolysiloxane of the following average composition formula:

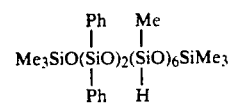

was added dropwise over 2 hours. After the completion of addition, the reaction mixture was aged for one hour at 80° C. After the disappearance of the absorption peak (1650 cm$^{-1}$) attributable to the allyl group of allyl methacrylate was confirmed by an IR spectrometer, the reaction mixture was cooled to room temperature.

Next, a separate flask was charged with 60 grams of toluene, 61.8 grams of allyl glycol, and 0.2 gram of 2% ethanol solution of chloroplatinic acid. To the flask at 80° C., the entire reaction mixture (toluene solution of an addition product, hydrogenpolysiloxane having allyl methacrylate added thereto) was added dropwise over 2 hours. After the completion of addition, the reaction mixture was aged for 2 hours at 80° C. The disappearance of the Si—H absorption peak (2160 cm$^{-1}$) was confirmed by an IR spectrometer.

After removal of the toluene and unreacted reactants by vacuum distillation and filtration, there was isolated 161.8 grams (yield 96%) of an addition product. Measurement of physical properties identified this product to have the following average composition formula.

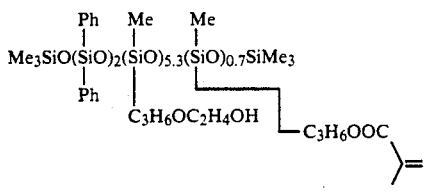

Viscosity: 715 cs at 25° C.
Refractive index: 1.4894 at 25° C.
H$^1$-NMR ($\delta$, acetone $\delta$=2.0 standard, same in the following examples): 0.07 (38.1H); 1.50 (12H); 1.54 (12H); 3.47 (33.2H); 5.43 (0.7H); 6.00 (0.7H); 7.31 (20H).
Elemental analysis: Found: C 52.9%; H 7.8%; Calcd.: C 52.3%; H 7.9%.
Infrared absorption spectrum: FIG. 1.

EXAMPLE 2

Two stages of addition reaction were carried out by the same procedure as in Example 1 except that a flask was first charged with 50 grams of toluene, 16.1 grams of allyl glycidyl ether, and 0.1 gram of 2% ethanol solution of chloroplatinic acid. There was obtained 161.6 grams (yield 98%) of a corresponding addition product. Measurement of physical properties identified this product to have the following average composition formula.

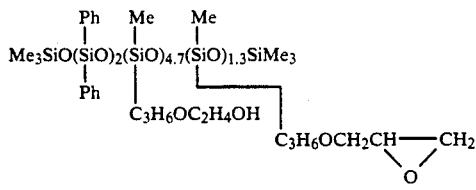

Figure 2:
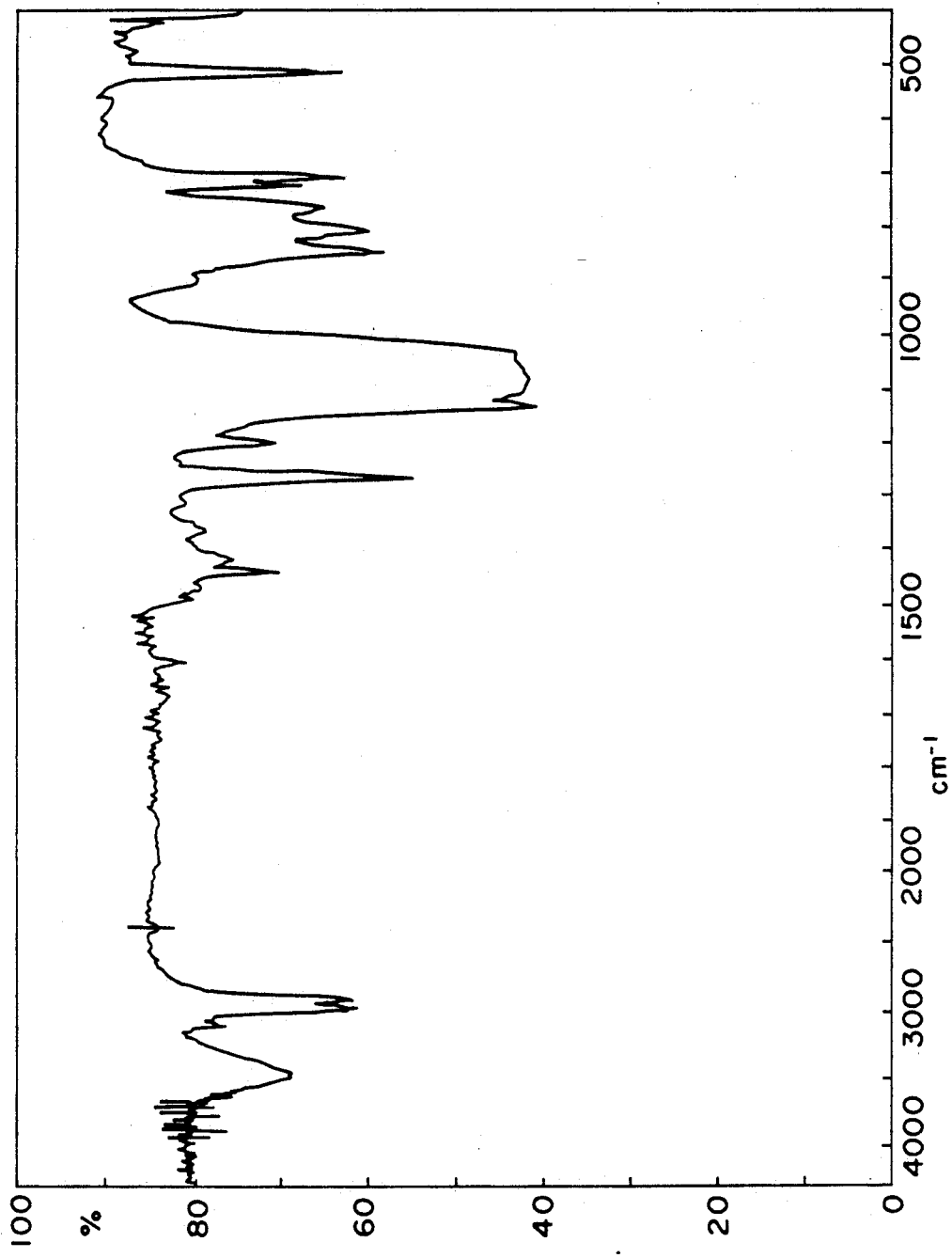

Viscosity: 1530 cs at 25° C.
Refractive index: 1.4960 at 25° C.
H$^1$-NMR ($\delta$): 0.07 (36H); 0.48 (12H); 1.55 (12H); 2.43 (1.3H); 2.60 (1.3H); 3.42 (34.7H); 7.35 (20H).
Elemental analysis: Found: C 52.5%; H 7.7%; Calcd.: C52.5%; H 7.9%.
Infrared absorption spectrum: FIG. 2.

EXAMPLE 3

A flask was charged with 100 grams of toluene, 19.7 grams of allyl glycol, and 0.2 gram of 2% ethanol solution of chloroplatinic acid. To the flask at 80° C., 100 grams of hydrogenpolysiloxane of the following average composition formula:

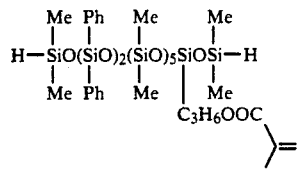

was added dropwise over 2 hours. After the completion of addition, the reaction mixture was aged for 2 hours at 80° C. After the disappearance of the Si—H absorption peak (2130 cm$^{-1}$) was confirmed by an IR spectrometer, the toluene and unreacted reactants were removed by vacuum distillation and filtration, isolating 116.4 grams (yield 98%) of an addition product which was identified to have the following average composition formula.

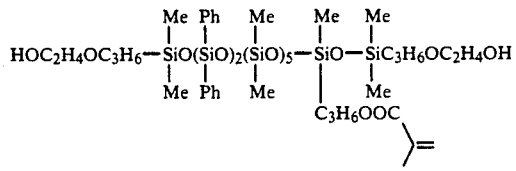

Figure 3:
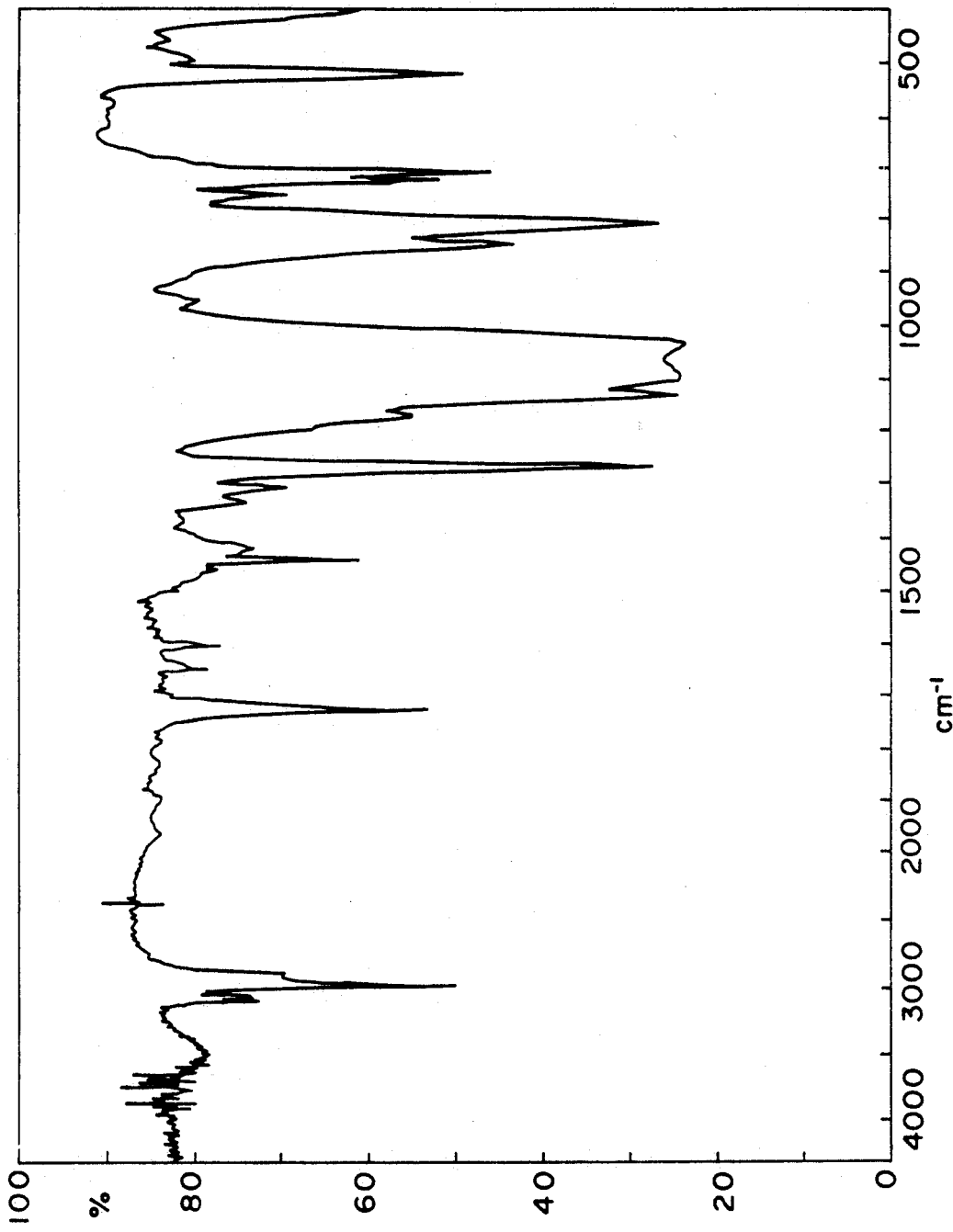

Viscosity: 195 cs at 25° C.
Refractive index: 1.4876 at 25° C.
H$^1$-NMR ($\delta$): 0.04 (48H); 0.47 (6H); 1.54 (6H); 3.43 (14H); 5.40 (1H); 5.98 (1H); 7.27 (20H);
Elemental analysis: Found: C 52.2%; H 7.5%; Calcd.: C 52.1%; H 7.6%.
Infrared absorption spectrum: FIG. 3.

EXAMPLE 4

The procedure of Example 3 was repeated except that 22.0 grams of allyl glycidyl ether was used instead of 19.7 grams of allyl glycol, isolating 119.8 grams (yield 99%) of a corresponding addition product which was identified to have the following average composition formula.

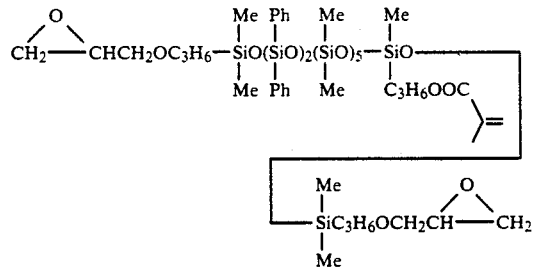

Figure 4:
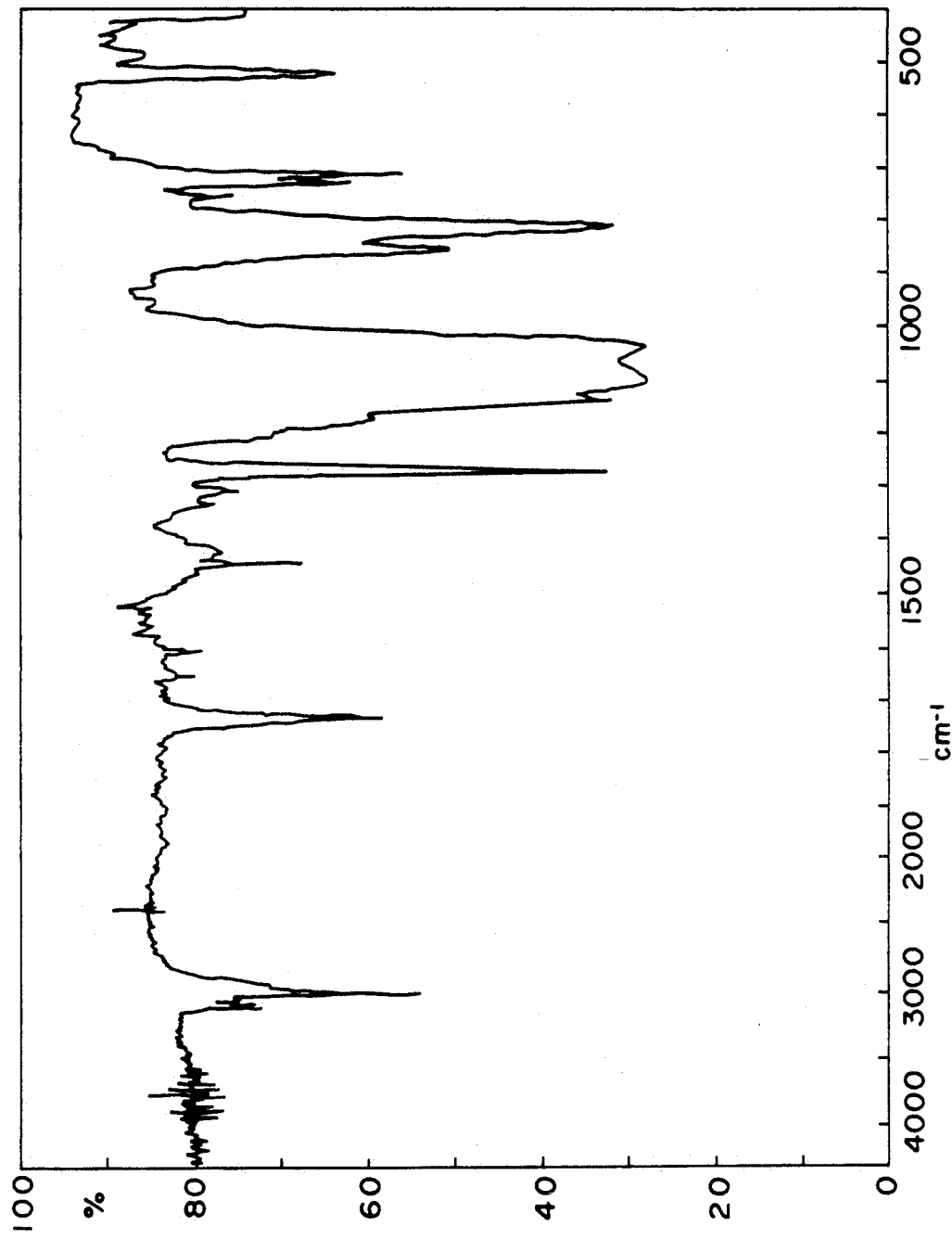

Viscosity: 450 cs at 25° C.
Refractive index: 1.4846 at 25° C.
H$^1$-NMR ($\delta$): 0.07 (48H); 0.48 (6H); 1.57 (6H); 2.38 (2H); 2.54 (2H); 3.33 (2H); 5.37 (1H); 5.97 (1H); 7.22 (20H).
Elemental analysis: Found: C 53.1%; H 7.3%; Calcd.: C 52.9%; H 7.5%.
Infrared absorption spectrum: FIG. 4.

Although some preferred embodiments have been described, many modifications and variations may be made thereto in the light of the above teachings. It is therefore to be understood that within the scope of the appended claims, the invention may be practiced otherwise than as specifically described.

We claim:

1. An organopolysiloxane of the following average composition formula (1):

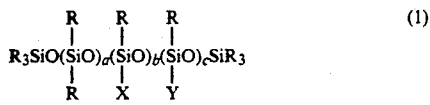

wherein
X and Y are different organic groups selected from the group consisting of 3-glycidoxypropyl, 3-hydroxypropyl, 3-(2'-hydroxyethoxy)-propyl, 3-acryloxypropyl, and 3-methacryloxy-propyl groups, with the proviso that X or Y is 3-glycidoxypropyl, R is an alkyl group having 1 to 6 carbon atoms or phenyl group, with the proviso that a diphenylsiloxane or methylphenylsiloxane unit is incorporated into the organopolysiloxane, and letters a, b and c are positive numbers within the range: $1 \leq a \leq 20$, $1 \leq b \leq 10$, and $1 \leq c \leq 10$.

2. An organopolysiloxane of the following average composition formula (2):

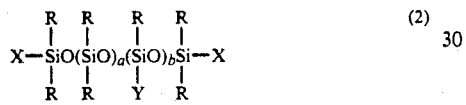

wherein
X and Y are different organic groups selected from the group consisting of 3-glycidoxypropyl, 3-hydroxypropyl, 3-(2'-hydroxy-ethoxy)propyl, 3-acryloxypropyl, and 3-methacryloxypropyl groups, with the proviso that X or Y is 3-glycidoxypropyl, R is an alkyl group having 1 to 6 carbon atoms or phenyl group, and letters a and b are positive numbers within the range: $1 \leq a \leq 20$ and $1 \leq b \leq 10$.

3. A method for producing an organopolysiloxane of the following average composition formula (1):

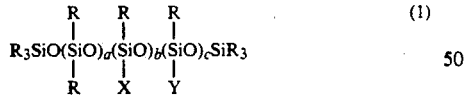

wherein
X and Y are different organic groups selected from the group consisting of 3-glycidoxypropyl, 3-hydroxypropyl, 3-(2'-hydroxyethoxy)-propyl, 3-acryloxypropyl, and 3-methacryloxypropyl groups, with the proviso that X or Y is 3-glycidoxypropyl; R is an alkyl group having 1 to 6 carbon atoms or phenyl group, with the proviso that a diphenylsiloxane or methylphenylsiloxane unit is incorporated into the organopolysiloxane; and letters a, b and c are positive numbers within the range: $1 \leq a \leq 20$, $1 \leq b \leq 10$, and $1 \leq c \leq 10$, comprising the steps of:

adding b mol of an unsaturated compound selected from the group consisting of allyl glycidyl ether, 1-vinyl-3,4-epoxycyclohexane, allyl alcohol, allyl glycol, allyl acrylate, and allyl methacrylate to SiH of an organohydrogenpolysiloxane of the following average composition formula (3):

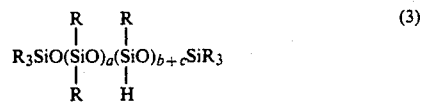

wherein R, a, b, and c are as defined above, in the presence of a catalytic amount of a platinum catalyst to conduct a hydrosilylation reaction, and adding c mol of another unsaturated compound selected from the same group as above to c mol of unreacted SiH of the organohydrogenpolysiloxane of formula (3), in the presence of a catalytic amount of a platinum catalyst to conduct a hydrosilylation reaction.

4. A method for producing an organopolysiloxane of the following average composition formula (2):

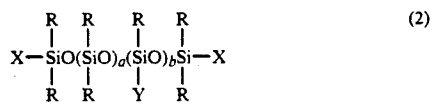

wherein
X and Y are different organic groups selected from the group consisting of 3-glycidoxypropyl, 3-hydroxypropyl, 3-(2'-hydroxy-ethoxy)propyl, 3-acryloxypropyl, and 3-methacryloxypropyl groups, with the proviso that X or Y is 3-glycidoxypropyl; R is an alkyl group having 1 to 6 carbon atoms or phenyl group, with the proviso that a diphenylsiloxane or methylphenylsiloxane unit is incorporated into the organopolysiloxane; and letters a and b are positive numbers within the range: $1 \leq a \leq 20$ and $1 \leq b \leq 10$, comprising the step of:

adding an unsaturated compound selected from the group consisting of allyl glycidyl ether, 1-vinyl-3,4-epoxy-cyclohexane, allyl alcohol, allyl glycol, allyl acrylate, and allyl methacrylate to SiH of an organohydrogenpolysiloxane of the following average composition formula (4):

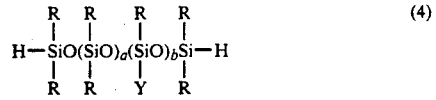

wherein Y, R, a, and b are as defined above, said unsaturated compound forming a functional group different from Y of the organohydrogenpolysiloxane of formula (4), in the presence of a catalytic amount of a platinum catalyst to conduct a hydrosilylation reaction.

5. A method for producing an organopolysiloxane of the following average composition formula (1):

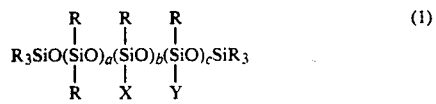

wherein X and Y are different organic groups selected from the group consisting of 3-glycidoxypropyl, 3-hydroxypropyl, 3-(2'-hydroxyethoxy)-propyl, 3- acryloxypropyl, and 3-methacryloxypropyl groups, with the proviso that X or Y is 3-glycidoxypropyl; R is an alkyl group having 1 to 6 carbon atoms or phenyl group, with the proviso that a diphenylsiloxane or methylphenylsiloxane unit is incorporated into the organopolysiloxane; and letters a, b and c are positive numbers within the range: $1 \leq a \leq 20$, $1 \leq b \leq 10$, and $1 \leq c \leq 10$, comprising the steps of:

adding an unsaturated compound selected from the group consisting of allyl glycidyl ether, 1-vinyl-3,4-epoxy-cyclohexane, allyl alcohol, allyl glycol, allyl acrylate, and allyl methacrylate to SiH of an organohydrogenpolysiloxane of the following average composition formula (3'):

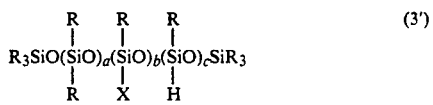

wherein X, R, a, b, and c are as defined above, said unsaturated compound forming a functional group different from X of the organohydrogenpolysiloxane of formula (3'), in the presence of a catalytic amount of a platinum catalyst to conduct a hydrosilylation reaction.

6. An organopolysiloxane of the following average composition formula (1):

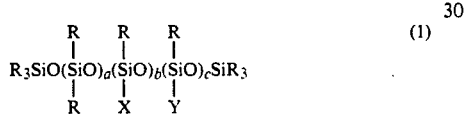

wherein
X and Y are different organic groups selected from the group consisting of 3-hydroxypropyl, 3-(2-hydroxyethoxy)propyl, 3-acryloxypropyl, and 3-methacryloxypropyl groups,
R is an alkyl group having 1 to 6 carbon atoms or phenyl group, with the proviso that a diphenylsiloxane or methylphenylsiloxane unit is incorporated into the organopolysiloxane, and
letters a, b and c are positive numbers within the range: $1 \leq a \leq 20$, $1 \leq b \leq 10$, and $1 \leq c \leq 10$.

7. An organopolysiloxane of the following average composition formula (2):

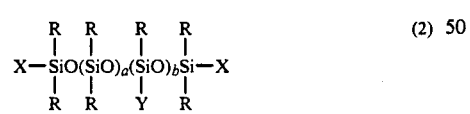

wherein
X and Y are different organic groups selected from the group consisting of 3-hydroxypropyl, 3-(2'-hydroxyethoxy)propyl, 3-acryloxypropyl, and 3-methacryloxypropyl groups,
R is an alkyl group having 1 to 6 carbon atoms or phenyl group, with the proviso that a diphenylsiloxane or methylphenylsiloxane unit is incorporated into the organopolysiloxane, and
letters a and b are positive numbers within the range: $1 \leq a \leq 20$ and $1 \leq b \leq 10$.

8. The organopolysiloxane of claim 1, wherein R is a member selected from the group consisting of methyl, phenyl, and both methyl and phenyl.

9. The organopolysiloxane of claim 2, wherein R is a member selected from the group consisting of methyl, phenyl, and both methyl and phenyl.

10. The method of claim 3, wherein R is a member selected from the group consisting of methyl, phenyl, and both methyl and phenyl.

11. The method of claim 4, wherein R is a member selected from the group consisting of methyl, phenyl, and both methyl and phenyl.

12. The method of claim 5, wherein R is a member selected from the group consisting of methyl, phenyl, and both methyl and phenyl.

13. The organopolysiloxane of claim 6, wherein R is a member selected from the group consisting of methyl, phenyl, and both methyl and phenyl.

14. The organopolysiloxane of claim 7, wherein R is a member selected from the group consisting of methyl, phenyl, and both methyl and phenyl.

15. The method of claim 3, wherein the organohydrogenpolysiloxane of formula (3) is selected from the group consisting of

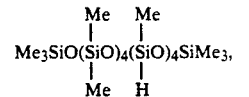

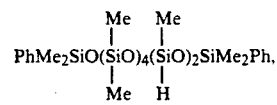

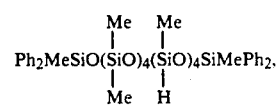

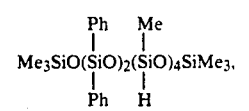

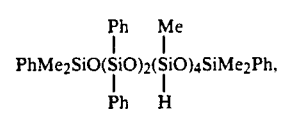

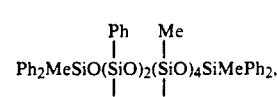

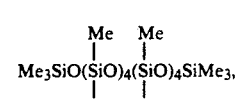

and

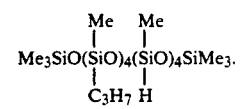

16. The method claim 4, wherein the organohydrogenpolysiloxane of formula (4) is selected from the group consisting of

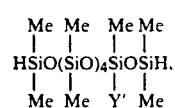

-continued
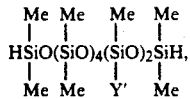
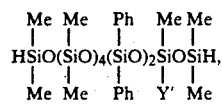
-continued
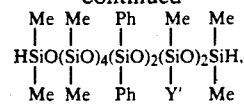
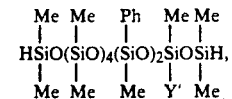
and
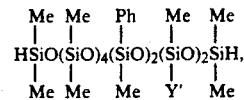
wherein Y' is a 3-acryloxypropyl or 3-methacryloxypropyl group.
* * * * *